United States Patent [19]

De Silvestri

[11] Patent Number: 5,191,806

[45] Date of Patent: Mar. 9, 1993

[54] SAFETY INTERLOCK DEVICE FOR A MOTOR VEHICLE GEARBOX CONTROL

[75] Inventor: Fosco De Silvestri, Maranello, Italy

[73] Assignee: Ferrari SpA, Modena, Italy

[21] Appl. No.: 813,916

[22] Filed: Dec. 27, 1991

[51] Int. Cl.$^5$ ...................... F16H 59/00; F16H 61/00
[52] U.S. Cl. .................................... 74/477; 74/483 R
[58] Field of Search .................. 74/477, 473 R, 483 R

[56] References Cited

U.S. PATENT DOCUMENTS

| | | | |
|---|---|---|---|
| 3,389,616 | 6/1968 | Forekas | 74/477 |
| 4,467,665 | 8/1984 | Katayama et al. | 74/477 X |
| 4,550,628 | 11/1985 | Yarnell | 74/483 R X |
| 4,782,719 | 11/1988 | Yarnell | 74/477 X |

FOREIGN PATENT DOCUMENTS

| | | | |
|---|---|---|---|
| 3102057 | 8/1982 | Fed. Rep. of Germany | 74/477 |
| 2014672 | 8/1979 | United Kingdom | 74/477 |

Primary Examiner—Leslie A. Braun
Assistant Examiner—Khoi Q. Ta
Attorney, Agent, or Firm—Sughrue, Mion, Zinn, Macpeak & Seas

[57] ABSTRACT

In a motor vehicle gearbox the selector rods (30-33) carrying the forks which actuate the gear coupling devices are disposed with their axes (30a-33a) at the same distance from the axis (17) of the gearbox shaft with which the coupling devices are associated. When one of the rods is moved away from its neutral position the other rods are locked in the neutral position by locking means (18) including a first series of locking dowels (34) slidable in separate substantially parallel seats (35) formed in the gearbox casing, and cooperating with respective notches (30b-33b) provided on the selector rods. The said seats (35) open into a common cylindrical cavity (36), extending transversely thereto, in which there is provided a train of locking pins (37) resiliently thrust against one another. When a selector rod is actuated the associated locking dowel (34) projects into the said common cavity (36) causing a displacement of the train of auxiliary locking pins (37) such that these latter obstruct the exits from the seats (35) of the locking dowels (34) associated with the other selector rods.

3 Claims, 3 Drawing Sheets

SAFETY INTERLOCK DEVICE FOR A MOTOR VEHICLE GEARBOX CONTROL

BACKGROUND OF THE INVENTION

The present invention relates to a safety device for a motor vehicle gearbox of the type comprising a first shaft carrying a first series of gears connected for rotation with it, and a second shaft carrying a second series of gears which are freely rotatably mounted on the said second shaft and which are in constant mesh with respective gears of the first shaft, and a plurality of coupling devices for connecting respective gears of the said second series for rotation with the said second shaft.

The invention relates in particular to a safety device for a motor vehicle gearbox control, of the type comprising a plurality of selector rods slidable parallel to one another in the casing of the gearbox and each carrying at least one fork member for controlling a respective coupling device, each selector rod being displaceable between a neutral position and at least one operative position, and locking means for locking, with respect to the gearbox casing, all the selector rods with the exception of that which is selected at the time, the said locking means including a series of locking dowels slidable in respective seats in the gearbox casing and having active ends adapted to cooperate with respective reference notches provided on the selector rods when these are in their neutral positions so that, when a selector rod is moved away from its neutral position, the other selector rods are retained in their neutral positions by the engagement of the said locking dowels in the respective reference notches.

A control device of the type indicated above is, for example, described and illustrated in European Patent EP-B-0170630. In the conventional arrangement of this type, the axes of the selector rods are disposed in the same plane. This involves the necessity of providing the various selector rods with fork members of different shapes and dimensions, the distance from the axis of each selector rod to the axis of the shaft with which the coupling devices are associated being different from that of the other selector rods.

SUMMARY OF THE DRAWINGS

Thus with the impossibility of disposing the selector rods in the same plane, or to improve the known arrangement of the type described above, in particular facilitating the gearbox manufacture and assembly operations, and also simplifying the storage of the gearbox components the present invention provides a control device of the aforesaid type, characterised by the combination of the following characteristics:

a) at least the majority of the said selector rods are disposed with their axes at substantially the same distance from the axis of the said second shaft, b) the seats for the said locking dowels are disposed on separate, substantially parallel axes and, at the ends opposite the active ends of the locking dowels, open into a common cylindrical cavity extending transverse thereto, within which is slidable a train of locking pins resiliently thrust against one another and disposed in such a way that, when a selector rod is moved away from its neutral position, the associated locking dowel projects into the said common cylindrical cavity and constrains the auxiliary locking pins to obstruct the exits from the seats of the locking dowels associated with the other selector rods.

The arrangement of the selector rods on axes disposed at the same distance from the axis of the shaft carrying the coupling devices makes it possible to use substantially identical fork members for the various selector rods, which simplifies the manufacture, assembly and storage of components of the gearbox of the invention. At the same time the said arrangement of the selector rods does not create particular problems in relation to the locking of the selector rods which have not been actuated at any particular time thanks to the provision of separate, substantially parallel seats for the locking dowels associated with the various selector rods and a common cylindrical cavity extending transversely of the said seats, in which the said train of locking pins is housed.

BRIEF DESCRIPTION OF THE INVENTION

Figure 1:
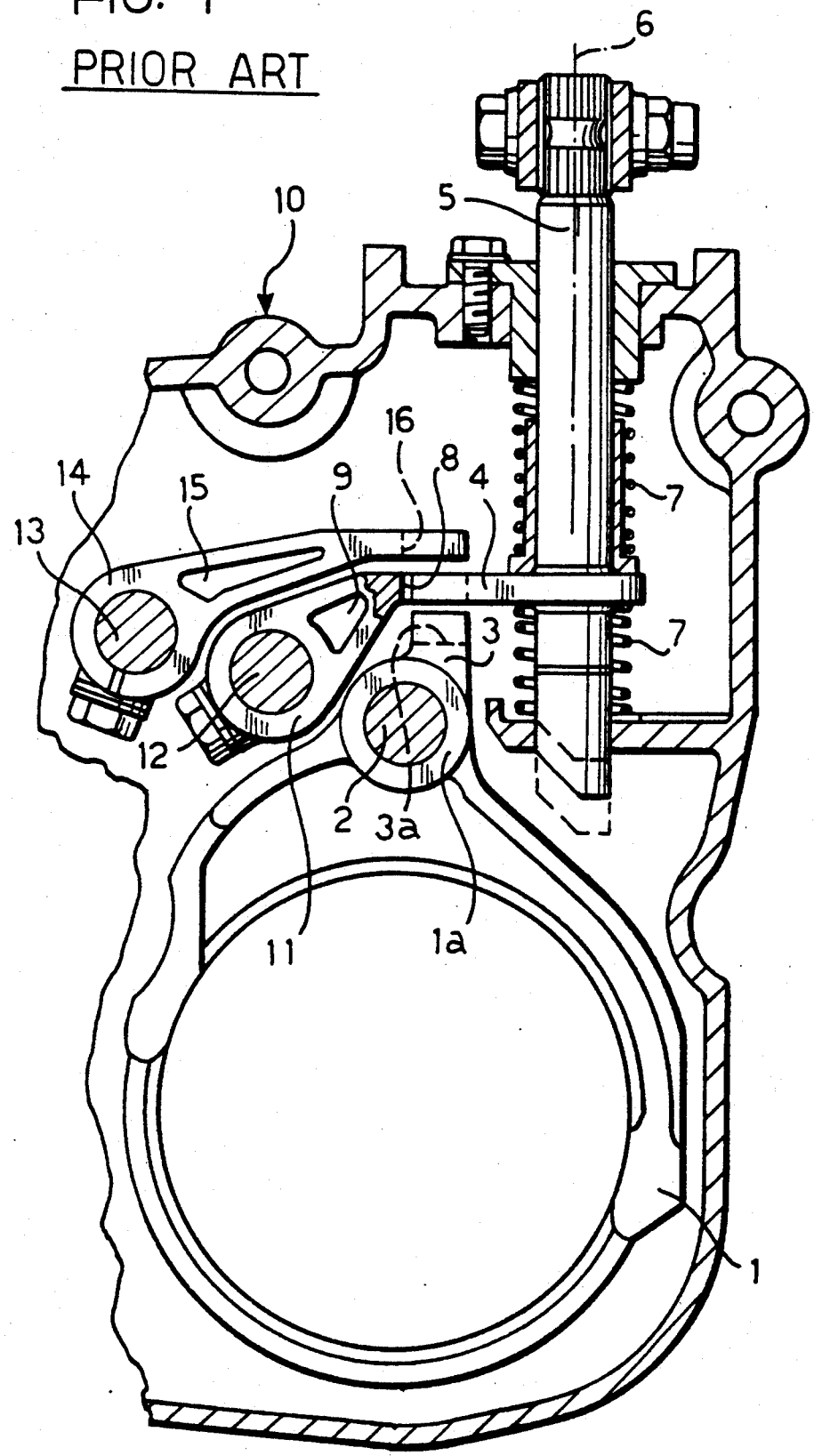
Figure 2:
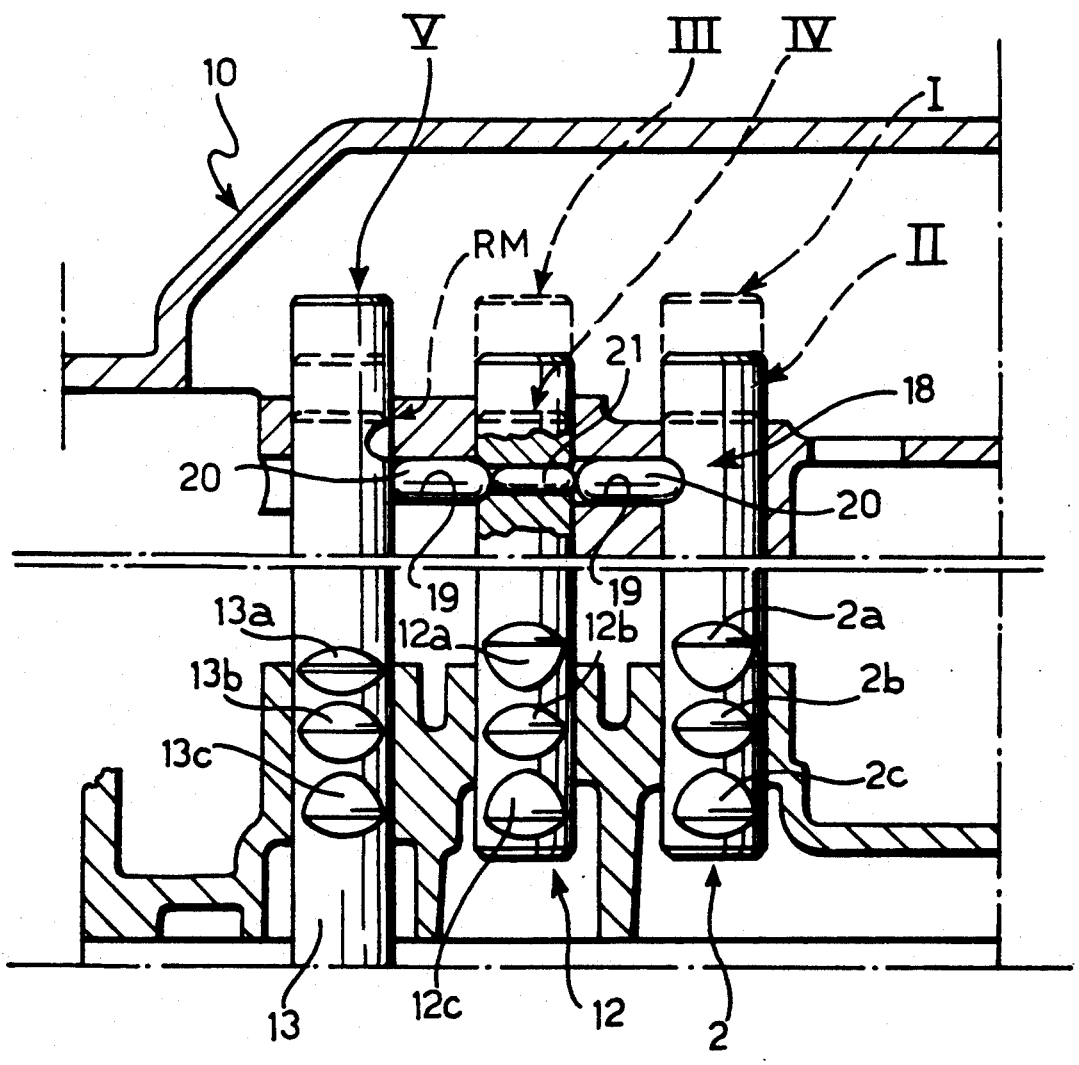

The invention will now be described with reference to the appended drawings, provided purely by way of non limitative example, in which:

FIGS. 1 and 2 illustrate a prior art motor vehicle gearbox control device; and

Figure 3:
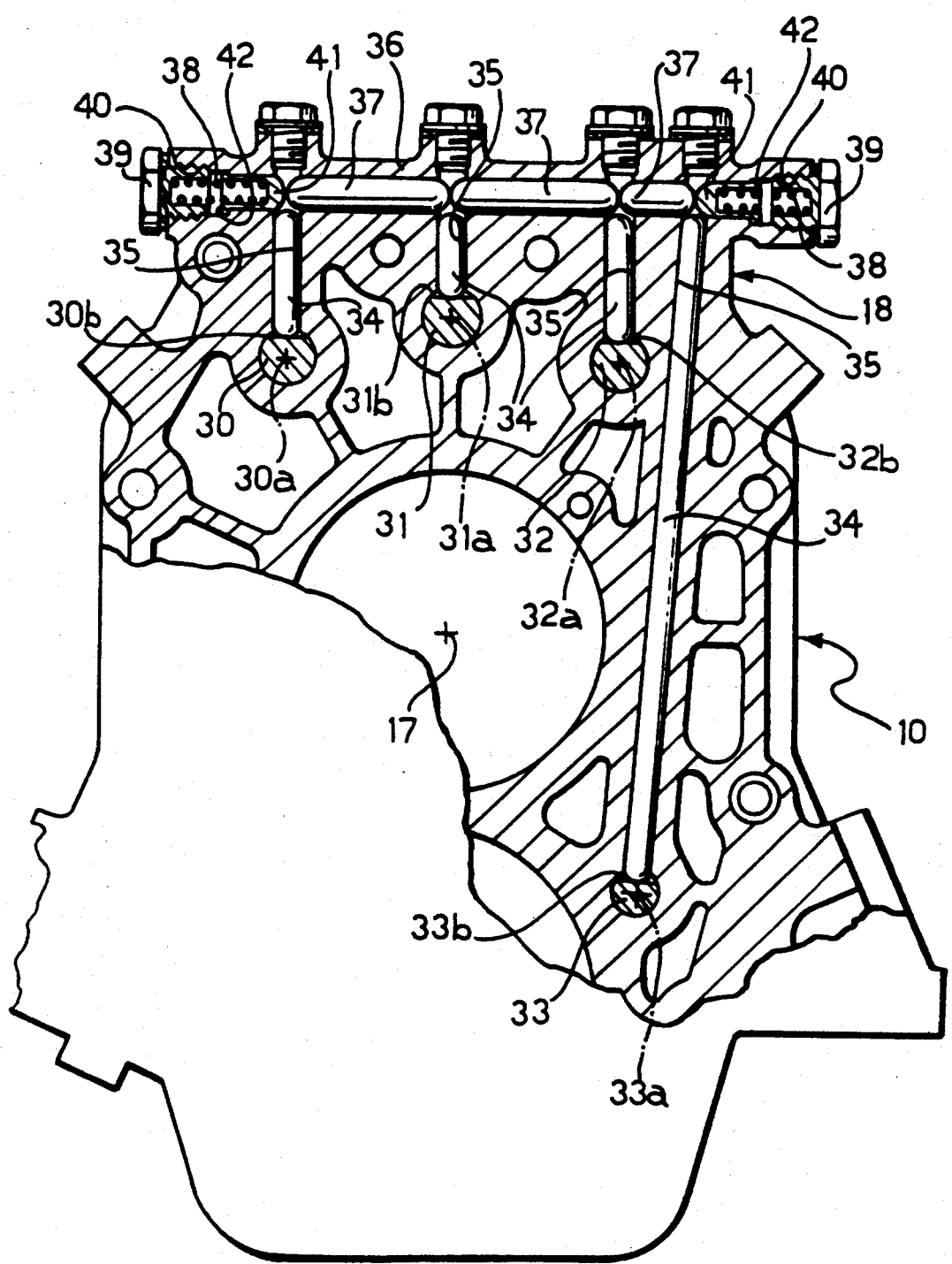

FIG. 3 is a partial sectional view of a gearbox provided with the device of the invention.

FIG. 1 is a sectional view on a plane perpendicular to the axes of the gearbox shafts. In a conventional manner, the gearbox comprises a series of pairs of constantly meshing gears (not illustrated) and coupling devices (also not illustrated) for controlling the engagement of the various gear ratios. Each pair of gears is constituted by a gear connected for rotation with a first shaft of the gearbox and a gear mounted freely rotatably on a second shaft of the gearbox, this latter being moreover provided with an associated coupling device for connecting the freely rotatable gear for rotation with the second shaft of the gearbox. As is known, the said arrangement can be made in different ways. For example the synchroniser devices can be associated with the so-called primary shaft of the gearbox, that is to say the shaft which is driven by the drive shaft via the clutch, or with the secondary shaft, or even some with the primary shaft and some with the secondary shaft. This detail, however, lies outside the ambit of the present invention, which is applicable to any possible gearbox configuration. For this reason, and for reasons of simplicity and clarity, the said details have not been illustrated in the attached drawings.

The coupling devices which control the engagement of the various gear ratios are controlled, in a manner known per se, by means of fork members one of which is indicated with the reference numeral 1 in FIG. 1. The fork 1 has a boss 1a fixed to a selector rod 2 which is slidable in the casing 3 of the gearbox. In the arrangement illustrated in FIGS. 1 and 2 (which forms the subject of European Patent EP-B-0170630) the rod 2 has a neutral position which has been illustrated in solid outline in FIG. 2, and two operative end positions (illustrated in broken outlines in FIG. 2) corresponding to the respective engagement of first and second gear. The rod 2 is moreover provided with three notches 2a, 2b, 2c intended to cooperate with a ball or like member (not illustrated) resiliently thrust against the rod 2 in order to snap engage this rod in each of the said three positions. With reference to FIG. 1, the boss 1a of the fork 1 which is fixed to the rod 2 is provided with a projection 3 having a slot 3a which can receive a finger 4 projecting radially from a control shaft 5 rotatably mounted about its geometric axis 6 in the gearbox casing 10. The shaft 5 is also slidable axially in the casing 10 and is biased by springs 7 towards the neutral position which is illustrated in FIG. 1. In this position the finger 4 is received in the slot 8 of a nose 9 having a boss 11 fixed to a selector rod 12 which is slidable in the gearbox casing 10 along an axis parallel to the axis of the rod 2 and which is intended to control (by means of a fork member not visible in the drawings) the coupling device for engaging third and fourth gears. Like the rod 2, the rod 12 has a neutral position and two operative end positions (FIG. 2), the said three positions being defined by the engagement of a ball or like member (not illustrated), resiliently urged against the rod 12 in one of three notches 12a, 12b, 12c with which the rod 12 is provided.

The known device illustrated in FIGS. 1 and 2 includes a third rod 13, slidable in the gearbox casing 10, on which there is fixed a boss 14 forming part of a nose-like projection 15 the free end of which has a slot 16 adapted to cooperate with the finger 4. The rod 13 also has two operative end positions corresponding to the engagement of fifth gear and reverse gear, and a central neutral position.

As can be seen, in the known arrangement explained above the axes of the three selector rods 2, 12, 13 are disposed in a single plane. It follows that the distances from the axes of these rods to the axis 17 of the shaft carrying the synchroniser devices differ and consequently the dimensions and shape of the associated fork members mounted on the rods are different.

The operation of the said known device is evident from the preceding description. When the shaft 5 is in the neutral position illustrated in FIG. 1 it can be rotated to cause engagement of third or fourth gear (in dependence on the direction of rotation) by means of the finger 4, the nose 9 and the selector rod 12. When it is desired to engage first or second gear the shaft 5 must first be thrust axially to carry the finger 4 into engagement with the seat 3a of the projection 3, after which a rotation of the shaft 5 causes engagement of first or second gear (in dependence on the direction of rotation) by means of the finger 4 and the projection 3 of the fork member 1. Similarly, when it is desired to engage fifth gear or reverse, it is necessary first to cause an axial displacement of the shaft 5 to carry the finger 4 into engagement with the seat 16 of the nose-like projection 15, after which the shaft 5 must be rotated in the direction corresponding to the engagement of fifth gear or reverse gear.

With reference to FIG. 2, the prior art gearbox further includes locking means, generally indicated with the reference numeral 18, such that when one of the selector rods is moved away from its neutral position the other selector rods remain locked in the neutral position with respect to the gearbox casing. In the above-described known arrangement this is obtained by providing within the gearbox casing two coaxial cylindrical seats 19 extending transversely of the axes of the rods 2, 12, 13, within which are slidable locking dowels 20 having active ends adapted to cooperate with respective reference notches provided in the rods 2, 12, 13. The rod 12 is also provided with a transverse through hole within which a further, auxiliary locking dowel 21 is slidable mounted, which is interposed between the two locking dowels 20. The arrangement is such that when one of the rods is moved away from its neutral position the train constituted by the two principal locking dowels 20 and the auxiliary dowel 21 is displaced such that the two locking dowels 20 come into engagement with respective reference notches provided on the two non-actuated selector rods thereby locking these latter with respect to the gearbox casing.

FIG. 3 illustrates a gearbox according to the invention. In this figure the parts corresponding to those of FIGS. 1 and 2 are indicated with the same reference numerals. In the embodiment illustrated in FIG. 3 the gearbox is provided with four selector rods 30, 31, 32, 33. The selector rod 30 controls engagement of second and third gear. The selector rod 31 controls engagement of fourth and fifth gear. The selector rod 32 controls engagement of sixth and seventh gear, whilst the selector rod 33 controls engagement of first and reverse gears. As will be evident from FIG. 3 the axes 30a, 31a, 32a, 33a of the said selector rods are disposed at the same distance from the axis 17 of the gearbox shaft with which the coupling devices are associated. This makes it possible for the selector rods to have associated fork members of the same shape and dimensions, with the advantage of facilitating manufacture, assembly and storage of the components of the gearbox of the invention.

Notwithstanding this arrangement, the device of the invention nevertheless guarantees that when one of the selector rods is moved away from its neutral position the other selector rods can be displaced only by an insignificant distance which in any event is such as to maintain the other gear ratios in neutral position.

In the arrangement of the invention, the locking means 18 comprise four main locking dowels 34 which are slidable in cylindrical holes 35 disposed on separate substantially parallel axes. Each main locking dowel 34 has an active end which cooperates with a respective reference notch 30b, 31b, 32b, 33b formed in the respective selector rod. The ends of the seats 35 opposite the active ends of the main locking dowels 34 open into a common cylindrical cavity 36 formed in the gearbox casing 10 and extending transversely with respect to the seats 35. In the transverse cylindrical cavity 36 there is arranged a train of locking pins 37. At the ends of the train of pins 37 there are disposed two auxiliary pins 41 acted on by two coil springs 38 each having an end in engagement with the respective pin 41 and an opposite end in engagement with an associated closure plug 39 screwed into a larger diameter threaded end portion 40 of the cylindrical cavity 36. The springs 38 bias the auxiliary pins 41 into engagement with a shoulder 42 formed at the bottom of the seat 40. The system is designed such that, when the gearbox is in neutral position the two auxiliary pins 41 maintain the locking pins 37 in a centred position in which engagement of any gear is permitted. When one of the selector rods is moved away from its neutral position the associated reference notch comes out of engagement with the associated locking dowel 34 and therefore causes this locking dowel 34 to project into the transverse cylindrical cavity 36. As can be seen in FIG. 3, the train of auxiliary locking pins 37 is arranged in such a way that, when all the rods 30, 31, 32, 33 are in their neutral positions, the respective locking dowels 34 face the transition zone between one locking pin 37 and the adjacent pin. Therefore, when the movement of a selector rod causes the respective locking dowel 34 to project into the cavity 36, the said locking dowel 34 is interposed between two adjacent locking pins 37 thereby constraining the said locking pins 37 to obstruct the exits from the seats 35 associated with the other selector rods. These latter, therefore, are not free to move away from their neutral positions since the associated locking dowels 34 cannot project into the common transverse cavity 36.

When the gearbox is returned to a neutral position and during the change from one gear to another the springs 38, by means of the auxiliary pins 41, return the locking pins 37 to their central positions illustrated in FIG. 3.

Naturally, the principle of the invention remaining the same, the details of construction and the embodiments can be widely varied with respect to what has been described and illustrated purely by way of example. In particular, the device of the invention is naturally applicable to any type of gearbox, whatever the particular configuration of the gearbox or whether the gearbox is of conventional type with lever control or provided with actuator means for servo control of the selector rods.

What is claimed is:

1. A motor vehicle gearbox control device for a gearbox of the type having
   at least one shaft carrying a series of gears which are freely rotatable on said shaft, said shaft further carrying a plurality of coupling devices for selectively coupling the gears of said series to said shaft for rotation therewith,
   said control device comprising:
   a plurality of selector rods slidable in the gear box casing along parallel directions, each said selector rod carrying at least one fork member for actuation of a respective said coupling device, each selector rod being displaceable between a neutral position and at least one operative position, and
   safety means comprising locking means for locking all said selector rods with respect to said gearbox casing with the exception of that which is selected at the time, said locking means comprising:
   a series of locking dowels slidably mounted in respective seats of said gearbox casing and having active ends adapted to cooperate with respective reference notches provided on said selector rods, when these are in their neutral positions, whereby when a selector rod is moved away from its neutral position, the other selector rods are retained in their neutral positions by the engagement of said locking dowels within respective said reference notches,
   the improvement comprising:
   a plurality of said selector rods are disposed with their axes at the same distance from the axis of the shaft of the gear box with which said coupling devices are associated,
   the seats for said locking dowels have separate substantially parallel axes and open at their ends opposite the active ends of said locking dowels into a common cylindrical cavity extending transversely with respect to said seats, and
   a train of locking pins is housed in said common cylindrical cavity, resiliently urged against one another and disposed in such a way that when a selector rod is actuated the associated said locking dowel projects into said common cylindrical cavity and constrains the locking pins to obstruct the exits from the seats of the locking dowels associated with the remaining said selector rods.

2. The device of claim 1, wherein said common cylindrical cavity is constituted by a cylindrical through-hole formed in said gearbox casing, having two larger diameter threaded end portions within which are screwed two closure elements, wherein between the auxiliary locking pin disposed at each end of said train of locking pins and the associated closure element there is interposed a coil spring, and wherein between the end two auxiliary locking pins, each further auxiliary locking pin is of such a length as to extend between the axes of two adjacent seats housing said locking dowels in such a way that when the selector rods are all in their neutral positions each locking dowel faces a transition zone between two adjacent locking pins.

3. The device of claim 2, wherein said locking dowels and said locking pins are all constituted by cylindrical pins with rounded ends.

* * * * *